United States Patent [19]

Ezoe et al.

[11] 4,149,408

[45] Apr. 17, 1979

[54] DIAGNOSTIC MONITORING DEVICE FOR CLOSED LOOP AIR/FUEL RATIO CONTROL SYSTEM OF VEHICLE ENGINE

[75] Inventors: Mitsuhiko Ezoe; Setsuzo Tachibana, both of Yokosuka, Japan

[73] Assignee: Nissan Motor Company, Limited, Japan

[21] Appl. No.: 893,995

[22] Filed: Apr. 6, 1978

[30] Foreign Application Priority Data

Apr. 8, 1977 [JP] Japan .................................. 52-39429

[51] Int. Cl.[2] .............................................. G01M 15/00

[52] U.S. Cl. ...................................................... 73/118

[58] Field of Search .................... 73/116, 117.3, 27 R, 73/118; 123/119 EC

[56] References Cited

U.S. PATENT DOCUMENTS

| | | | |
|---|---|---|---|
| 4,004,452 | 1/1977 | Logothetis et al. | 73/27 R X |
| 4,031,747 | 6/1977 | Blanke | 73/116 |
| 4,088,100 | 5/1978 | Tokura et al. | 123/119 EC |

*Primary Examiner*—Jerry W. Myracle

*Attorney, Agent, or Firm*—Robert E. Burns; Emmanuel J. Lobato; Bruce L. Adams

[57] ABSTRACT

At least one engine parameter is used to estimate the state of the gas sensor while the frequency of the feedback control signal produced in the closed loop control system is measured to see if it is normal or not. A logic circuit produces a pair of signals respectively indicative of normal or abnormal functioning of the closed loop control system in response to the estimated state of the gas sensor and the frequency of the feedback control signal, to illuminate visual indicators. An additional gas sensor tester is additionally provided for detecting the internal resistance of the sensor.

12 Claims, 4 Drawing Figures

DIAGNOSTIC MONITORING DEVICE FOR CLOSED LOOP AIR/FUEL RATIO CONTROL SYSTEM OF VEHICLE ENGINE

FIELD OF THE INVENTION

This invention generally relates to a diagnostic monitoring device for a closed loop air-fuel ratio control system employed by an internal combustion engine. More specifically the present invention relates to such a device which is capable of a diagnostic indication of normal or abnormal conditions of the closed loop system via an illuminating display whereby the condition of the closed loop system can be readily ascertained by the vehicle driver and/or operator.

BACKGROUND OF THE INVENTION

Recently, internal combustion engines of vehicles have been equipped with closed loop air-fuel control system. These closed loop systems are employed for providing a desired air-fuel ratio of the air-fuel mixture fed to the engine so that harmful components contained in the exhaust gases are effectively reduced in a catalytic converter disposed in the exhaust gas passage of the engine. Further the desired air/fuel ratio contributes to the stability of the engine operation.

When a malfunction occurs in the closed loop system, it is preferable to disable the closed loop system in order to prevent an undesirable control with which a rich or lean air-fuel mixture may be fed to the engine. A technical expert of Nissan Motor Company of Japan has already proposed a display device which illuminatingly displays the frequency of a control signal obtained in a closed loop control system in Japanese Utility Model Application Ser. No. 50-140049. In the above-mentioned device a light emitting diode is connected via a resistor to the output of the comparator which is utilized for comparing the magnitude of signal of a gas sensor such as a zirconium oxygen sensor with a reference signal or to the output of the control unit which includes P-I (proportional-integral) controller connected to the comparator. The light emitting diode emits light, for instance if the device is connected to the output of the comparator, when the magnitude of the output signal of the gas sensor is greater than that of the reference signal. It is already known that the light emitting diode emits light in response to the fluctuation of the gas sensor output three or four times per a second when the crank shaft of the engine rotates at high speed, i.e., from 5000 rpm to 6000 rpm while the same emits light once in three to four seconds when the engine speed is low, i.e., for instance at an idling operation.

Above-mentioned device has some advantages viz. the construction thereof is simple and it requires little electric power. However, the display device includes disadvantage or a drawback which will be discussed hereinbelow. When the temperature of the gas sensor is low, the internal resistance of the gas sensor is so high that maximum and minimum values of the output signal of the sensor approach 0 volt so an inadequate difference between these maximum and minimum values occurs. Therefore, desirable closed loop control can not performed. In order to prevent this undesirable feedback control the closed loop control system is usually disabled when the temperature of the gas sensor is below a predetermined level. Since the light emitting diode of the display device does not emit light when the closed loop control system is disabled, the driver of the vehicle is apt to misunderstand that the closed loop control system is out of order or abnormal unless the vehicle driver is aware of the function of the closed loop control system in detail.

If the closed loop control system does not include means for disabling the system, frequency of the control signal produced by the closed loop control system is somewhat different from that during normal conditions when the temperature of the gas sensor is below a predetermined level. Therefore, the light emitting diode emits light with an irregular frequency whereby the vehicle driver may misunderstand that a malfunction has occured in the closed loop system.

SUMMARY OF THE INVENTION

The present invention has been developed to overcome the above-mentioned drawback of the prior art. According to the present invention a diagnostic monitoring device which includes engine parameter detecting means, feedback control signal detector, a logic circuit, and display means is provided.

The engine parameter detecting means conjectures (predicts) the temperature of a gas sensor which is utilized for a closed loop air/fuel ratio control system, i.e., whether the gas sensor temperature is high enough or suitable for producing an output signal with normal maximum and minimum values or not. The feedback control signal frequency detector detects the frequency of a signal produced in the closed loop control system. The logic circuit produces first and second signals in response to the output signals of the engine parameter detecting means and the feedback control signal frequency detector. The first signal indicative of the normal condition of the closed loop system is produced when the frequency of the feedback control signal is above a predetermined level or within a normal range and when the gas sensor temperature is conjectured as being normal. The second signal indicative of the abnormal condition of the closed loop system is produced when the frequency of the feedback control signal is below the predetermined level or out of the normal range and when the gas sensor temperature is conjectured as being normal. Two visual indicators are included in the display means and thus each indicator respectively indicates the normal and abnormal conditions in response to the first and second signals to inform the vehicle driver. None of the first and second signals are produced in the logic circuit when the temperature of the gas sensor is conjectured as inappropriate so that none of the visual indicators indicates either normal nor abnormal conditions.

A gas sensor tester is additionally provided for detecting the internal resistance of the gas sensor so that the driver can test, via a manual switch, whether the internal resistance of the gas sensor is within a predetermined range or not when informed that the closed loop system is abnormal.

Therefore, it is a primary object of the present invention to provide a diagnostic monitoring device which correctly detects the normal or abnormal condition of the closed loop air/fuel ratio control system.

A further object of the present invention is to provide such a device with which the vehicle driver can readily become aware of the condition of the closed loop system.

A still further object of the present invention is to provide such a device with which the vehicle driver can ascertain not only the condition of the closed loop system but also the condition of the gas sensor.

BRIEF DESCRIPTION OF THE DRAWINGS

The invention will become more readily apparent from the following description taken in conjunction with the accompanying drawings in which.

DETAILED DESCRIPTION OF THE PREFERRED EMBODIMENTS

Figure 1:
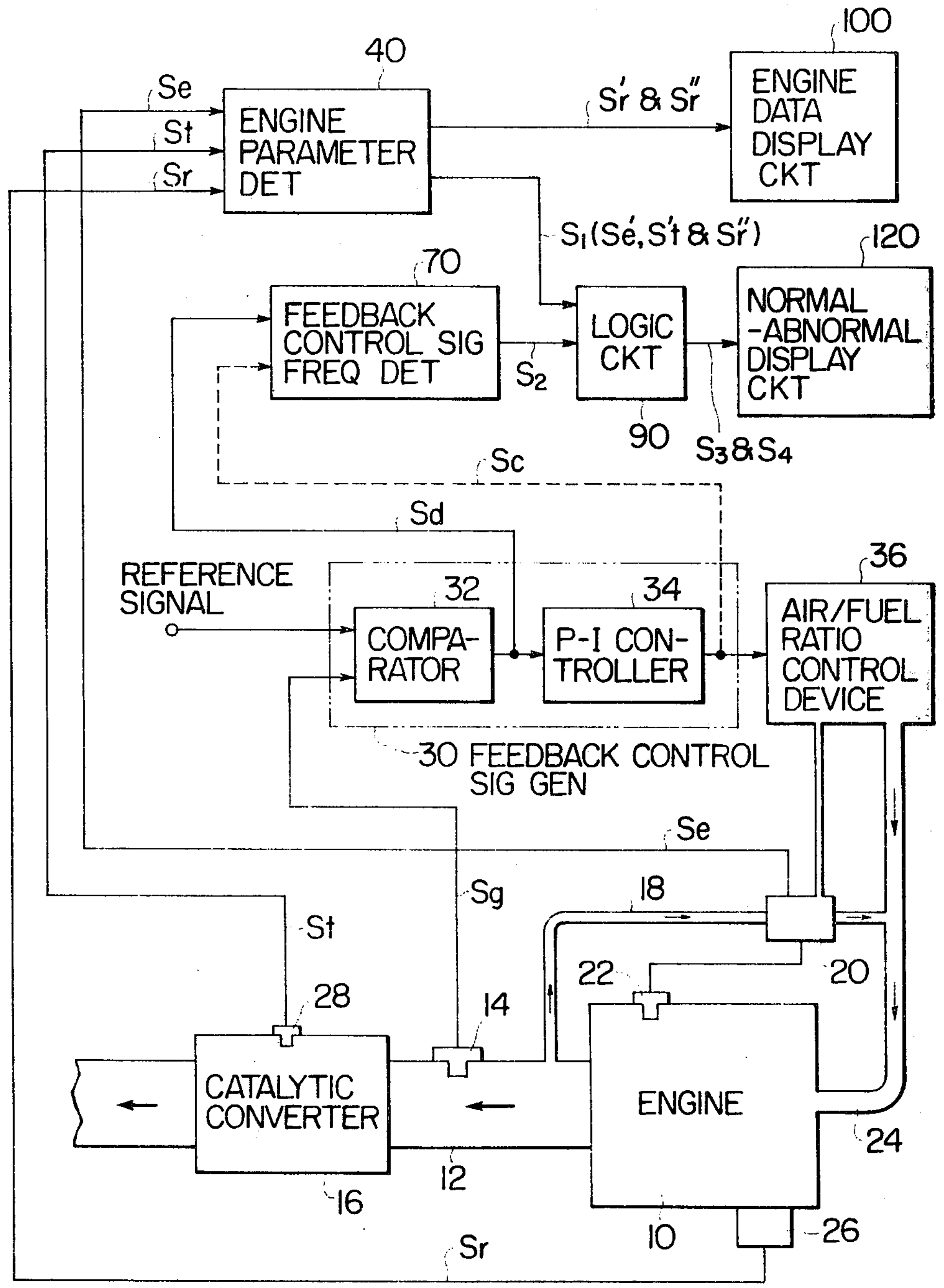
FIG. 1 shows in a block diagram form the preferred embodiment of the diagnostic monitoring device according to the present invention for a closed loop air/fuel ratio control system.

FIG. 1 schematically illustrates the diagnostic monitoring device according to the present invention. The monitoring device includes an engine parameter detector 40, a feedback control signal frequency detector 70, a logic circuit 90, an engine data display circuit 100 and a normal-abnormal conditions display circuit 120. An internal combustion engine 10 is arranged to be fed with an air-fuel mixture the ratio of which is controlled by an air/fuel ratio control device 36 such as a carburetor or an injection system. A catalytic converter 16 is disposed in the exhaust gas passage 12 of the engine 10 so that harmful components of the exhaust gases are reduced therein. A gas sensor 14 such as a zirconium oxygen sensor is disposed in the exhaust gas passage 12 upstream of the catalytic converter 16 to produce a signal Sg indicating the concentration of a component contained in the exhaust gases. A feedback control signal generator 30 which includes a comparator 32 or a difference signal generator (not shown) and a P-I (proportional-integral) controller 34, is responsive to the signal Sg so that an output signal Sc of the feedback control signal generator 30 is utilized as a control signal of the air/fuel ratio in the air/fuel ratio control device 36. The air/fuel ratio is then controlled toward a stoichiometric or a desired ratio which is represented by a reference signal fed to the comparator 32.

FIG. 1 further illustrates EGR (exhaust gas recirculation system including an EGR pipe 18, an EGR control unit 20 and an engine temperature sensor 22. The EGR control unit 20 is arranged to recycle the exhaust gas when the temperature of the engine 10 is over a predetermined level.

The ignition circuit of the engine is designated by a numeral 26 in FIG. 1. An ignition signal Sr produced in the ignition circuit 26 is utilized for indicating the rotational speed of the crank shaft (not shown) of the engine 10. If the engine is equipped with an engine speed detector such as a tachometer generator, the output signal of the detector may be utilized instead.

The catalytic converter 16 includes a temperature sensor 28 so that a signal St indicating the temperature of the catalyst in the catalytic converter 16 is detected. The EGR control unit 20 includes a solenoid valve (not shown) for passing the exhaust gas therethrough to recycle same. The solenoid valve is arranged to open for passing the exhaust gas therethrough when energized by an electric current produced in the EGR control unit 20. Therefore, the terminals across the solenoid valve are fed with a certain voltage Se. It is to be understood that the EGR control unit 20 is arranged to produce the electric current when the engine coolant temperature is over a predetermined level. Above-mentioned three signals Sr, St and Se are fed to the engine parameter detector 40 where these signals are utilized for conjecturing (predicting) the gas sensor state.

The engine parameter detector 40 is arranged to produce output signals S'e, S't, S'r and S"r which respectively represent conditions of the engine 10. Since these engine parameters are utilized for guessing the condition of the gas sensor 14, there is no need to provide means for detecting the temperature of the gas sensor 14.

It is to be noted that the engine speed is detected not only for conjecturing the gas sensor temperature but also for conjecturing the frequency of the variation of the concentration of a component contained in the exhaust gases. Since the frequency of the variation of the concentration varies in accordance with the engine speed, it is preferable to maintain the engine speed within a predetermined range, when the diagnostic monitoring device is operated, so that the engine 10 produces exhaust gases which contain a component the concentration of which is relatively steady. Two output signals S'r and S"r among the four output signals are applied to the engine data display circuit 100 which illuminatingly displays engine speed etc. indicating whether suitable conditions for starting the diagnostic monitoring of the closed loop system is already achieved or not.

The comparator 32 produces an output signal Sd when the magnitude of the signal Sg of the gas sensor 14 is over that of the reference signal. The comparator 32, however, can be substituted with a difference signal generator (not shown). The output signal Sd of the comparator 32 is applied to the feedback control signal frequency detector 70. The P-I controller is connected to the comparator 32 to produce the control signal Sc. Though the signal Sd is utilized as an input signal of the feedback control signal frequency detector 70, the control signal Sc can be utilized instead as shown by a dotted line in FIG. 1.

The feedback control signal frequency detector 70 produces an output signal $S_2$ when the frequency of the signal Sd or Sc is within a predetermined range or above a predetermined level. The above-mentioned predetermined range or level of the frequency is selected to correspond with that of the variation of the concentration of a component contained in the exhaust gases produced by the engine 10 when rotating at a speed within the before-mentioned predetermined range. It is to be noted that when a malfunction occurs in the feedback control signal generator 30, the frequency of the signals Sd or Sc becomes very low. Further when the feedback control is not performed or when the closed loop control signal generator 30 is disabled, the magnitude of the output signal Sc of the feedback control signal generator 30 becomes constant.

The output of the feedback control signal frequency detector 70 is connected to an input of the logic circuit 90 while the other input of the logic circuit 90 is connected to the output of the engine parameter detector 40. The logic circuit 90 is arranged to produce two output signals $S_3$ and $S_4$ which respectively indicate a normal condition and an abnormal condition in response to the input signals $S_1$(S'e, S't and S"r) and $S_2$. The outputs of the logic circuit 90 are connected to the normal-abnormal conditions display circuit 120 which illuminatingly displays each condition in accordance with the output signals $S_3$ and $S_4$ of the logic circuit 90.

The constructions and the functions of the engine parameter detector 40, feedback control signal frequency detector 70, logic circuit 90, engine data display circuit 100 and the normal-abnormal condition display circuit 120 will be described in detail hereinbelow.

Figure 2:
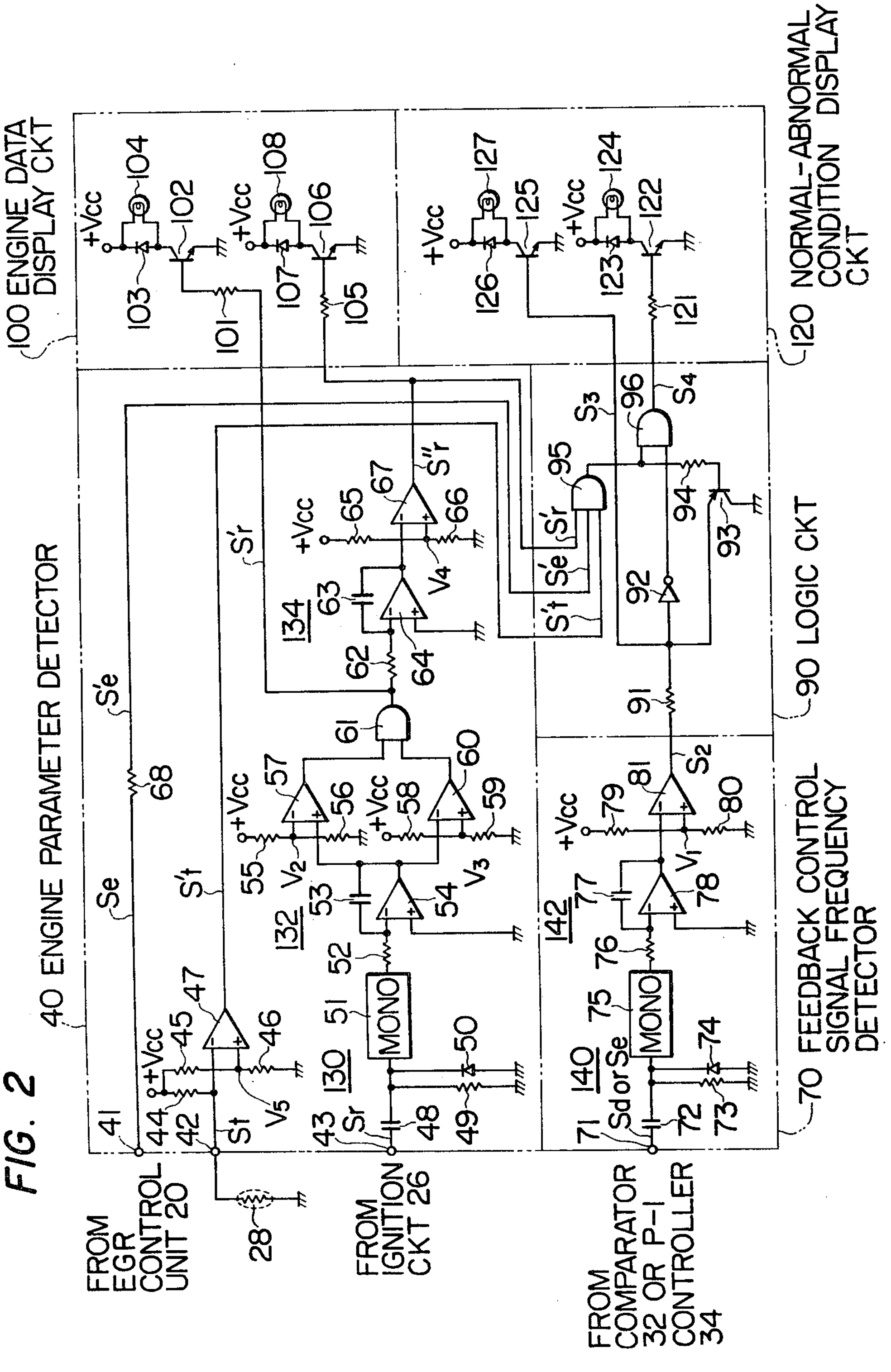
FIG. 2 shows circuitry including an engine parameter detector, a feedback control signal frequency detector, a logic circuit, an engine data display circuit and a normal-abnormal conditions display circuit shown in FIG. 1.

Reference is now made to FIG. 2 which shows circuitry including the engine parameter detector 40, the feedback control signal frequency detector 70, logic circuit 90, the engine data display circuit 100 and the normal-abnormal condition display circuit 120 shown in FIG. 1.

The engine parameter detector 40 includes three input terminals 41, 42 and 43. The input terminal 41 is connected to the EGR control unit 20 shown in FIG. 1 so that the signal Se indicating the performance of the recirculation of the exhaust gas is fed to the engine parameter detector 40 via the input terminal 41. A resistor 68 is interposed between the input terminal 41 and an input of an AND gate 95 included in the logic circuit 90.

Another input terminal 42 is connected to a temperature sensor 28 such as a thermistor disposed in the catalytic converter 16 shown in FIG. 1. The thermistor 28 has a negative temperature coefficient. The input terminal 42 is connected to the inverting input of an operational amplifier 47 which is utilized as a comparator while the inverting input is connected via a resistor 44 to a positive power supply +Vcc. One terminal of a resistor 45 is connected to the positive power supply +Vcc while the other terminal of same is connected to the non-invertering input of the operational amplifier 47. A resistor 46 is interposed between the non-inverting input of the operational amplifier 47 and ground so that two resistors 45 and 46 constitute a voltage divider providing a predetermined voltage $V_5$ at the junction thereof which voltage is applied to the non-inverting input of the operational amplifier 47. The resistance of the thermistor 28 varies in accordance with the temperature and thus a voltage across the thermistor varies in inverse proportion to the temperature. The operational amplifier 47 is operated as a comparator to produce an output signal S't when the voltage at the inverting input is below that at the non-inverting input. This means that the output signal S't is produced when the temperature detected by the thermistor 28 is over a predetermined level. The output signal S't is fed to one of the inputs of the AND gate included in the logic circuit 90.

The third input terminal 43 is connected to an ignition circuit 26 shown in FIG. 1 to receive the ignition pulses Sr. A capacitor 48 is interposed between the input terminal 43 and the input of a monostable multivibrator 51 while a resistor 49 and a diode 50 are connected in parallel between the input of the monostable multivibrator 51 and ground. The capacitor 48 and the resistor 49 constitute a differentiation circuit 130 while the diode is provided to eliminate negative pulses contained in the signal Sr. The output of the monostable multivibrator 51 is connected via a resistor 52 to the inverting input of an operational amplifier 54 while the non-inverting input thereof is connected to ground. A capacitor 53 is connected across the inverting input and the output terminal of the operational amplifier 54 so that the operational amplifier 54 operates as an integrator 132. The output of the operational amplifier 54 is respectively connected to the non-inverting input of an operational amplifier 57 and the inverting input of an operational amplifier 60. Two voltage dividers (no numeral) respectively includes a pair of resistors 55, 56 and 58, 59. The junction between resistors 55 and 56 is connected to the inverting input of the operational amplifier 57 while the other junction between the resistors 58 and 59 is connected to the non-inverting input of same so that a pair of predetermined voltages $V_2$ and $V_3$ are respectively applied to these inputs. Both of outputs of the operational amplifiers 57 and 60 are respectively connected to two inputs of an AND gate 61. The output of the AND gate 61 is connected via a resistor 101 to the base of a transistor 102 which is included in the engine data display circuit 100. The output of the AND gate 61 is further connected via a resistor 62 to the inverting input of an operational amplifier 64 while the non-inverting input of same is connected to ground. A capacitor 63 is interposed between the inverting input of the operational amplifier 64 and the output of same so the operational amplifier 64 operates as an integrating circuit 134. The output of the operational amplifier 64 is connected to the inverting input of an operational amplifier 67 while the non-inverting input of same is connected to a junction between two resistors 65 and 66 which are connected in series between the positive power supply +Vcc and ground for providing a predetermined voltage $V_4$ at the non-inverting input of the operational amplifier 67. The output of the operational amplifier 67 is also connected to an input of the AND gate 95 included in the logic circuit 90. The output of the operational amplifier 67 is further connected via resistor 105 to the base of a transistor 106 included in the engine data display circuit 100.

The engine data display circuit 100 includes two transistors 102 and 106, two resistors 101 and 105, two diodes 103 and 107, and two lamps 104 and 108. The collector of the transistor 102 is connected via the diode 103 to the positive power supply +Vcc while the lamp 104 is connected in parallel with the diode 103. The emitter of the transistor 102 is connected to ground. The collector of the transistor 106 is connected via the diode 107 to the positive power supply +Vcc while the lamp 108 is connected in parallel with the diode 107.

The feedback control signal frequency detector 70 includes an input terminal 71 for receiving the signal Sd or Sc produced in the comparator 32 shown in FIG. 1 or the P-I controller 34 also shown in FIG. 1.

A capacitor 72 is interposed between the input terminal 71 and the input of a monostable multivibrator 75 while a resistor 73 and a diode 74 are connected in parallel between the input of the monostable multivibrator 75 and ground. The capacitor 72 and the resistor 73 constitute a differentiation circuit 140 while the diode 74 is provided to eliminate negative pulses contained in the signal Sd or Sc. The output of the monostable multivibrator 75 is connected via a resistor 76 to the inverting input of an operational amplifier 78 while the non-inverting input thereof is connected to ground. A capacitor 77 is connected across the inverting input and the output terminal of the operational amplifier 78 so that the operational amplifier 78 operates as an integrator 142. The output of the operational amplifier 78 is connected to the inverting input of an operational amplifier 81 while the non-inverting input of same is connected to a junction connecting a pair of resistors 79 and 80 in series. The other terminal of the resistor 79 is connected to the positive power supply +Vcc while the other terminal of the resistor 80 is connected to ground. Therefore, the non-inverting input of the operational amplifier 81 is fed with a predetermined voltage $V_1$ produced by a voltage divider including the resistors 79 and 80. The output of the operational amplifier 81 is connected to one terminal of a resistor 91 included in the logic circuit 90.

The logic circuit 90 includes the resistor 91, a NOT gate 92, a pair of AND gates 95 and 96, a resistor 94 and a transistor 93. One terminal, which is not connected to the feedback control signal frequency detector 70, of the resistor 91 is connected to the input of the NOT gate the input of which is connected to the base of a transistor 125 included in the normal-abnormal conditions display circuit 120 and further is connected to the emitter of a transistor 93. The collector of the transistor 93 is connected to ground. The output of the NOT gate is connected to an input of the AND gate 96 while the output of the other AND gate 95 is connected to the other input terminal of the AND gate 96. The output of the AND gate 95 is further connected via a resistor 94 to the base of the transistor 93. The output of the AND gate 96 is connected via a resistor 121 to the base of a transistor 122 included in the normal-abnormal conditions display circuit 120.

The normal-abnormal condition display circuit 120 includes the resistor 121, two transistors 122 and 125, two diodes 123 and 126, and two lamps 124 and 127. The arrangement of transistors 122 and 125, two diodes 123 and 126, and the two lamps 124 and 127 is the same as that of the engine data display circuit 100 and thus the description thereof is omitted.

The functions of the circuitry shown in FIG. 2 is described hereinbelow. The signal Se applied to the input terminal 41 of the engine parameter detector 40 is suitably transformed into a signal S'e by the resistor 68. With this arrangement one of the inputs of the AND gate 95 is fed with the signal S'e indicating an appropriate recirculation of the exhaust gas. The comparator 47 produces an output signal S't when the voltage of the signal St at the inverting input thereof is below the voltage $V_5$ at the non-inverting input of same. This means that the signal S't is produced when the detected temperature of the catalyst in the catalytic converter 16 is over a predetermined level since the thermister 28 has a negative temperature coefficient. The signal S't is also applied to one input of the AND gate 95.

The ignition pulse signal Sr applied to the input terminal 43 is transformed into a trigger signal by the differentiation circuit 130. The trigger signal is then supplied to the monostable multivibrator 51 to trigger same. The monostable multivibrator 51 produces an output pulse signal the pulse width of which is constant. The pulse width of the output pulse of the monostable multivibrator is determined by a time constant defined by elements included in the monostable multivibrator 51. The output of the monostable multivibrator 51 is then applied to the integrator 132 so that the output voltage of the integrator 132 starts decreasing. The decreasing rate of the output voltage varies in accordance with the number of pulse signals applied to the integrator 132 per unit time. The output signal of the integrator 132 is then applied to the pair of comparators 57 and 60 connected thereto. One comparator 57 produces an output signal when the output voltage of the integrator 132 is over the predetermined voltage $V_2$ applied to the inverting input thereof. The other comparator 60 produces an output signal when the output voltage of the integrator 132 is below the predetermined voltage $V_3$ applied to the non-inverting iput thereof. The voltage $V_3$ is selected to be higher than the voltage $V_2$ and thus both comparators produce output signals when the output voltage of the integrator 132 is within a range defined by the two voltages $V_2$ and $V_3$. In other words the pair of comparators 57 and 60 function as a window comparator. Therefore, the AND gate 61 produces an output signal S'r when the output voltage of the integrator 132 is in above-mentioned range, i.e., the rotational speed of the crank shaft of the engine 10 is within a predetermined range (for instance 2000±100 rpm).

The output signal S'r of the AND gate 61 is applied to the base of the transistor 102 via the resitor 101 both included in the engine data display circuit 100. Upon presence of the base current the transistor 102 becomes ON so that the collector current thereof flows through the lamp 104 to illuminate same. Since the output signal of the AND gate 61 is produced when the rotational speed of the crank shaft of the engine 10 is within a predetermined range as described hereinbefore, the lighting of the lamp 104 indicates this state.

The output signal S'r of the AND gate 61 is further supplied to the other integrator 134. Since the output voltage of the signal S'r is constant, the output voltage of the integrator 134 decreases as time advances to be below a predetermined voltage when a predetermined period of time has passed upon presence of the output signal S'r of the AND gate 61. The output signal of the integrator 134 is fed to the comparator 67 which produces an output signal S"r when the magnitude of the output signal of the integrator 134 is below the predetermined voltage $V_4$. The output signal S"r of the comparator 67 is applied to the transistor 106 to illuminate the lamp 108 in the same manner as the output signal S'r. With this arrangement the lamp 108 emits light when the rotational speed of the crank shaft of the engine 10 is continuously maintained within the predetermined range such as 2000±100 rpm for over a predetermined period of time.

The feedback control signal frequency detector 70 receives the output signal Sd or Sc at the input terminal 71 and thus a trigger signal is produced by the differentiation circuit 140 to trigger the monostable multivibrator 75. The output of the monostable multivibrator 75 is then fed to the integrator 142 so that the output voltage of the integrator 142 decreases as time advance. The output voltage of the integrator 142 is compared with the reference signal the voltage of which $V_1$, by the comparator 81 and thus the comparator 81 produces an output signal $S_2$ when the output voltage of the integrator 142 is below the voltage $V_1$. The output signal $S_2$ of the comparator 81 is supplied via the resistor 91 to the collector of the transistor 93 both included in the logic circuit 90.

The transistor 93 is responsive to the output signal of the AND gate 95 which produces the output signal when all of the input signals S't, S'e and S"r are simultaneously applied thereto. The transistor 93 is arranged to turn OFF when the output signal of the AND gate 95 is supplied thereto. With this provision, the output signal $S_2$ of the comparator 81 is applied via the resistor 91 to the base of the transistor 125 included in the normal-abnormal condition display circuit 120 as well as to the input of the NOT gate 92. Therefore, the lamp 127 connected to the transistor 125 illuminates upon presence of signals $S_2$, S't, S'e and S"r. This means that the lighting of the lamp 127 represents the normal condition of the closed loop air/fuel ratio control system. The signal $S_2$ of the comparator 81 is transformed into a low level signal by the NOT gate 92 to be applied to the AND gate 96 which also receives the output signal of the AND gate 95 at the other input. Therefore, the AND gate 96 does not produce an output signal $S_4$ if one or both of the input terminals is or are fed with low level voltage. In other words, the AND gate 96 produces the output signal $S_4$ upon non-presence of the signal $S_2$ while signals S't, S'e and S"r are present. Upon presence of the signal $S_4$ the lamp 124 connected to the transistor 122 illuminates indicating the abnormal condition of the closed loop system. It is to be noted that the lamp 124 for indicating the abnormal condition of the closed loop system illuminates only when the frequency of the signal Sd or Sc is below the predetermined value even though the condition of the gas sensor 14, which condition is estimated by way of signals such as Se, St and Sr, is appropriate for the gas sensor 14 to correctly detect the concentration of a component contained in the exhaust gases. Therefore, the lamp 124 does not emit light when the condition of the gas sensor 14 is not appropriate.

In the preferred embodiment shown in FIG. 1 and FIG. 2, a thermistor 28 disposed in the catalytic converter 16 is utilized for sensing the temperature of the exhaust gas. However, another temperature such as the temperature of the engine coolant can be utilized instead. When the temperature of the engine coolant is utilized, it is possible, for a driver, to manually turn on a switch which may be connected to the AND gate 95 for applying a signal such as the signal S't by confirming that the temperature of the coolant is over a predetermined level via a thermometer equipped on the instrument panel of the vehicle and thus the comparator 47 can be omitted.

Figure 3:
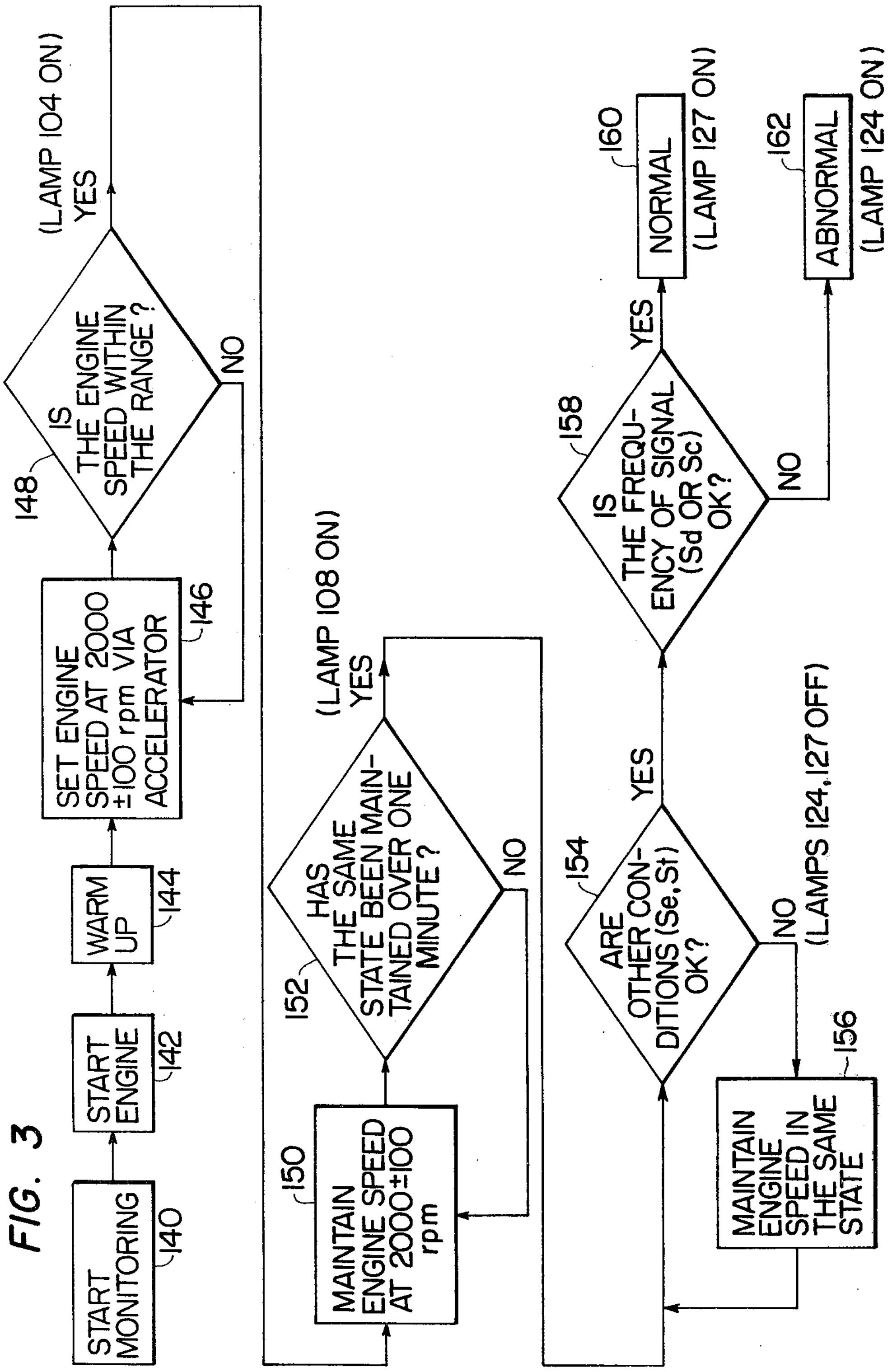
FIG. 3 is a flowchart of the diagnostic monitoring steps according to the present invention.

FIG. 3 illustrates the flow chart of the operations of the diagnostic monitoring device according to the present invention. At first the vehicle driver has to turn on a power switch (not shown) of the monitoring system. This step is referred to as "START MONITORING" 140. Then the driver turns on the ignition key switch of the vehicle to start the engine 10 (step 142). The vehicle driver waits for a while until the engine temperature rises (step 144). After the engine has been warmed up, the driver sets the rotational speed of the crank shaft of the engine 10 at 2000±100 rpm (step 146). It is checked whether the rotational speed has been set within the range, i.e., 1900 rpm to 2100 rpm, or not by the engine parameter detector 40 especially by the AND gate 61 shown in FIG. 2 (step 148). The lamp 104 of the engine data display circuit 100 illuminates indicating that the rotational speed is within the range. However, if the rotational speed is not within the range, the lamp 104 does not light. Then the vehicle driver has to operate the accelerator again to set the rotational speed.

Via the illumination of the lamp 104, the driver can hold the engine speed within the range for over one minute (step 150). It is checked whether the engine speed has been maintained within the range for over one minute or not by the comparator 67 shown in FIG. 2 (step 152). If the answer of the step 152 is YES, the lamp 108 emits simultaneously while if the answer is NO, the lamp 108 does not emit light instead. If the answer is NO, the driver has to maintain the same state until the lamp 108 illuminates. Other conditions such as the state of EGR control unit 20 and the temperature of the catalyst in the catalytic converter 16 respectively indicated by signals Se and St are detected simultaneously (step 154). Therefore, if the answer of the step 154 is YES, an output signal is produced at the output of the AND gate 95 shown in FIG. 2. If the answer of the step 154 is NO, none of the lamps 124 and 127 illuminate. This means that either the EGR or the catalyst temperature is not in appropriate condition yet. The vehicle driver has to wait until appropriate conditions are presented (step 156). The frequency of the signal Sd or Sc of the closed loop control system is detected by the feedback control signal frequency detector 70 (step 158). Upon presence of the output signal of the AND gate 95 one of the signals $S_3$ and $S_4$ is produced. If the frequency of the signal Sd or Sc of the closed loop control system is over the predetermined level, the answer of the step 158 is YES and thus the lamp 127 illuminates (step 160). If the frequency of the signal Sd or Sc is below the predetermined level, the answer of the step 158 is NO and thus the lamp 124 illuminates (step 162).

Since the feedback control signal frequency detector 70 shown in FIG. 2 includes only one comparator, the detector 70 can check only whether the magnitude of the output signal of the integrator 142 is greater than the predetermined voltage $V_1$ or not. However, if the feedback control signal frequency detector 70 includes two comparators such as comparators 57 and 60 included in the engine parameter detector 40, the feedback control signal frequency detector 70 checks whether the frequency of the signal Sc or Sc is within a predetermined range.

Figure 4:
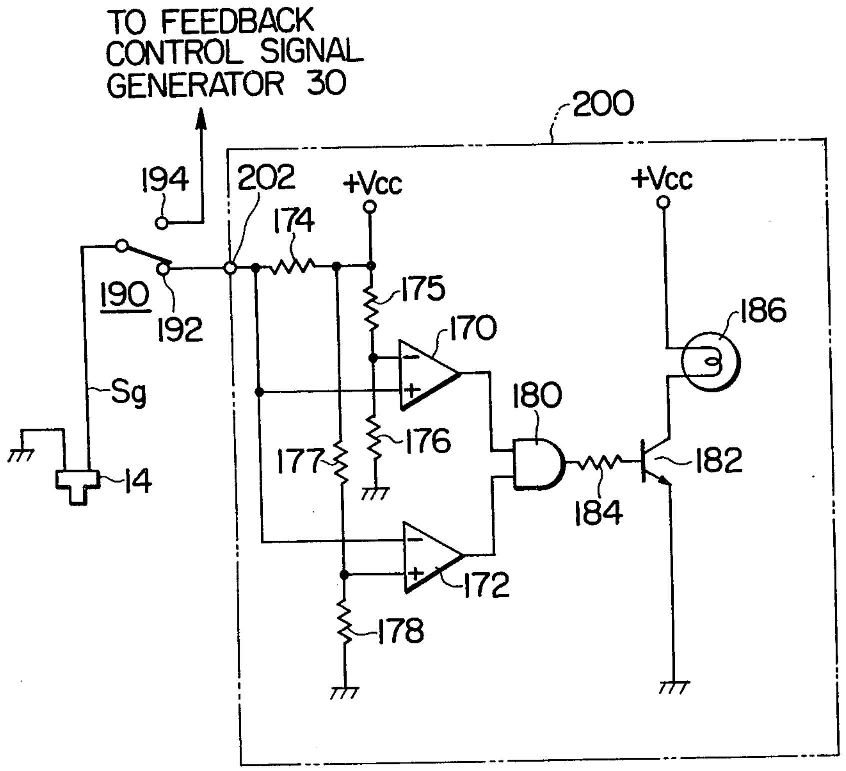
FIG. 4 shows the gas sensor tester according to the present invention which can be included in the diagnostic monitoring device.

Reference is now made to FIG. 4 which shows a gas sensor tester 200 which can be additionally provided to the diagnostic monitoring device according to the present invention. The input terminal 202 of the gas sensor tester 200 is connected to a terminal 192 of a manual switch 90 through which the signal Sg produced by the gas sensor 14 is normally applied via a terminal 194 thereof to the comparator 32 shown in FIG. 1. A resistor 174 is interposed between the input terminal 202 and the positive power supply +Vcc while a resistor 175 is interposed between the positive power supply +Vcc and the inverting input of an operational amplifier 170 which functions as a comparator. The noninverting input of the operational amplifier 170 is directly connected to the input terminal 202 as well as the noninverting input of the other operational amplifier 172 which also functions as a comparator. A resistor 176 is interposed between the inverting input of the operational amplifier 170 and ground. A resistor 177 is interposed between the positive power supply +Vcc and the noninverting input of the operational amplifier 172 while the noninverting input of same is connected via a resistor 178 to ground. It is to be understood that a pair of resistors 175 and 176 and the other pair of resistors 177 and 178 respectively constitute two voltage dividers so that the inverting input of the operational amplifier 170 and the noninverting input of the operational amplifier 172 are respectively supplied with different reference signals.

The outputs of both operational amplifiers 170 and 172 are respectively applied to two inputs of an AND gate 180 the output of which is connected via a resistor 184 to the base of a transistor 182. The collector of the transistor 182 is connected via a lamp 186 to the positive power supply +Vcc while the emitter of same is connected to ground.

The functions of the gas sensor tester 200 will be described hereinbelow. When the vehicle driver finds the lamp 124 emitting light indicating the abnormal condition of the closed loop air/fuel ratio control system, the driver turns the switch 190 toward the terminal 192 so that the output signal Sg of the gas sensor 14 is fed to the gas sensor tester 200. When the voltage across the gas sensor 14 is over the voltage at the inverting input of the operational amplifier 170, the operational amplifier 170 produces an output signal. In the same manner, the operational amplifier 172 produces an output signal when the voltage of the signal Sg is below the voltage at the noninverting input of the operational amplifier 172. Assuming the resistances of the resistors 174 to 177 inclusive are 100 k ohms while the resistance of the resistor 178 is 500 k ohms, both of the operational amplifiers 170 and 172 produce output signals if the internal resistance of the gas sensor 14 is between 100 k ohms and 500 k ohms. Upon presence of both output signals of the operational amplifiers 170 and 172 the AND gate 180 produces an output signal with which the transistor 182 turns ON to energize the lamp 186. This means that the lighting of the lamp 186 indicates that the internal resistance of the gas sensor 14 is within a predetermined range. With this provision, the lamp 186 does not illuminate if the gas sensor 14 shows a short, bad connection, broken wire or deterioration. Therefore, the vehicle driver can readily ascertain whether the condition of the gas sensor per se is normal or not.

What is claimed is:

1. A diagnostic monitoring device for a closed loop air/fuel ratio control system of an internal combustion engine, via which feedback control of the air/fuel mixture is performed, said closed loop system including; a gas sensor disposed in the exhaust gas passage of the engine for producing a first signal representative of the concentration of a component contained in the exhaust gases; a control signal generator connected to said gas sensor for producing a control signal in response to said first signal; and air/fuel ratio control means arranged to control the air/fuel ratio in response to said control signal: wherein the improvement comprises:

(a) engine parameter detecting means including at least one engine parameter detector for producing a second signal via which the state of the gas sensor is conjectured;

(b) feedback control frequency detector connected to said closed loop system for producing a third signal indicating that the frequency of a signal produced in said control signal generator in response to said first signal is within a predetermined range or above a predetermined level;

(c) a logic circuit connected to said engine parameter detecting means and to said feedback control frequency detector for producing fourth and fifth signals respectively indicating normal and abnormal conditions of the closed loop system; and (d) visual display means connected to said logic circuit for indicating said normal and abnormal conditions in accordance with said fourth and fifth signals.

2. A device as claimed in claim 1, wherein said engine parameter detecting means includes at least one of: first means for detecting that the rotational speed of the crank shaft of the engine is maintained within a predetermined range for a predetermined period of time, second means for detecting the normal recirculation of the EGR, third means for detecting that the temperature of the engine coolant is over a predetermined level, and fourth means for detecting that the temperature of the exhaust gases is over a predetermined level.

3. A device as claimed in claim 2, further comprising a second visual display means indicating a specific condition of an engine parameter.

4. A device as claimed in claim 3, wherein said engine parameter detecting means further includes third visual display means for indicating the continuation of the specific condition of an engine parameter for a predetermined period of time.

5. A device as claimed in claim 2, wherein said first means is responsive to the ignition pulses produced in the ignition circuit of the engine, said first means including a first differentiation circuit arranged to produce a first train of trigger signals in response to said ignition pulses, a first monostable multivibrator connected to said first differentiation circuit for producing a first train of pulses, the pulse width of which is constant, in response to said first trigger signals, a first integrator connected to said first monostable multivibrator for producing a first analog signal the magnitude of which decreases in response to the time for which the first pulse signals are applied thereto, and first and second comparators connected to said first integrator, said first comparator producing an output signal when the voltage of said first analog signal is over a first predetermined voltage, said second comparator producing an output signal when the voltage of said first analog signal is below a second predetermined voltage which is greater than said first predetermined voltage, a first AND gate connected to said first and second comparators for producing an output signal when the output signals of said first and second comparators coincide, a second integrator connected to said output of the first AND gate for producing a second analog signal the magnitude of which decreases in response to the time for which the output of the AND gate is applied thereat, and a third comparator connected to said second integrator for producing an output signal when the magnitude of the output of the second integrator is below a third predetermined level.

6. A device as claimed in claim 2, wherein said second means is responsive to the EGR control unit.

7. A device as claimed in claim 2, wherein said third means is responsive to a thermistor disposed in said engine so as to be exposed to the coolant thereof, said third means including a comparator for producing an output signal when the ambient temperature of the thermistor is over a predetermined level.

8. A device as claimed in claim 2, wherein said fourth means is responsive to a thermistor disposed in the catalytic converter which is arranged in the exhaust gas passage so as to be exposed to the catalyst, said fourth means including a comparator for producing an output signal when the temperature of the thermistor is over a predetermined level.

9. A device as claimed in claim 1, wherein said feedback control frequency detector includes a second differentiation circuit for producing a second train of trigger signals in response to a signal produced in said control signal generator, a second monostable multivibrator connected to said second differentiation circuit for producing a second train of pulses, the pulse width of which is constant, in response to said second trigger signals, a third integrator connected to said second monostable multivibrator for producing a third analog signal the magnitude of which increases or decreases in response to the time for which the second pulse signals are applied thereto, and a fourth comparator connected to said third integrator for producing an output signal in accordance with the magnitude of the output signal of the third integrator.

10. A device as claimed in claim 1, wherein said visual display means includes first and second lamps arranged to be respectively illuminated in response to said fourth and fifth signals.

11. A device as claimed in claim 1, further including a gas sensor tester connected via a manual switch to said gas sensor for detecting whether the internal resistance of said gas sensor is within a predetermined range or not.

12. A device as claimed in claim 11, wherein said gas sensor tester comprises a resistor interposed between a positive power supply and a terminal of said manual switch for producing a voltage divider with said gas sensor, fifth and sixth comparators connected to said terminal, said fifth comparator producing an output signal when a voltage across the gas sensor is over a fourth predetermined voltage, said sixth comparator producing an output signal when the voltage across the gas sensor is below a fifth predetermined voltage which is greater than said fourth predetermined voltage, a second AND gate connected to said fifth and sixth comparators for producing an output signal when the output signals of said fifth and sixth comparators occur simultaneously, and visual display means connected to said second AND gate for indicating the internal resistance of said gas sensor is within a predetermined range in response to said output of said AND gate.

* * * * *